(12) United States Patent
Beerlings

(10) Patent No.: US 6,422,828 B1
(45) Date of Patent: Jul. 23, 2002

(54) CYCLONIC EJECTION PUMP

(76) Inventor: Scipio P. S. Beerlings, Bisschop Bottemannestraat 32, NL-1817 EP Alkmaar (NL)

( * ) Notice: Subject to any disclaimer, the term of this patent is extended or adjusted under 35 U.S.C. 154(b) by 0 days.

(21) Appl. No.: 09/508,267

(22) PCT Filed: May 20, 1999

(86) PCT No.: PCT/NL99/00318

§ 371 (c)(1),
(2), (4) Date: Sep. 18, 2000

(87) PCT Pub. No.: WO99/61802

PCT Pub. Date: Dec. 2, 1999

(30) Foreign Application Priority Data

May 25, 1998 (NL) .............................................. 1009256

(51) Int. Cl.[7] .................................................. F04F 5/42
(52) U.S. Cl. ........................ 417/171; 417/179; 417/198
(58) Field of Search .......................... 417/78, 171, 179, 417/194, 198; 415/202

(56) References Cited

U.S. PATENT DOCUMENTS

| 1,009,908 | A | * | 11/1911 | Lafore | ......................... | 417/78 |
| 1,842,940 | A | | 1/1932 | Jannin | | |
| 3,857,651 | A | | 12/1974 | Bruno | | |
| 4,430,046 | A | | 2/1984 | Cirrito | | |
| 5,496,152 | A | * | 3/1996 | Heise et al. | ................... | 417/87 |
| 5,827,049 | A | * | 10/1998 | Castel | ......................... | 417/171 |
| 6,086,334 | A | * | 7/2000 | Castel | ......................... | 417/55 |

FOREIGN PATENT DOCUMENTS

FR          589 909          6/1925

* cited by examiner

Primary Examiner—Charles G. Freay
(74) Attorney, Agent, or Firm—Kenyon & Kenyon

(57) ABSTRACT

A cyclonic ejection pump is designed for large flow rates, for example, applicable to the so-called "Oceanic Thermal Energy Conversion," normally abbreviated to OTEC, an energy generating system developed for utilizing the potential thermal oceanic energy as well as for those applications for which a large capacity is required, such as the propelling of vessels. The pump is also able to function as a non-return valve.

9 Claims, 5 Drawing Sheets

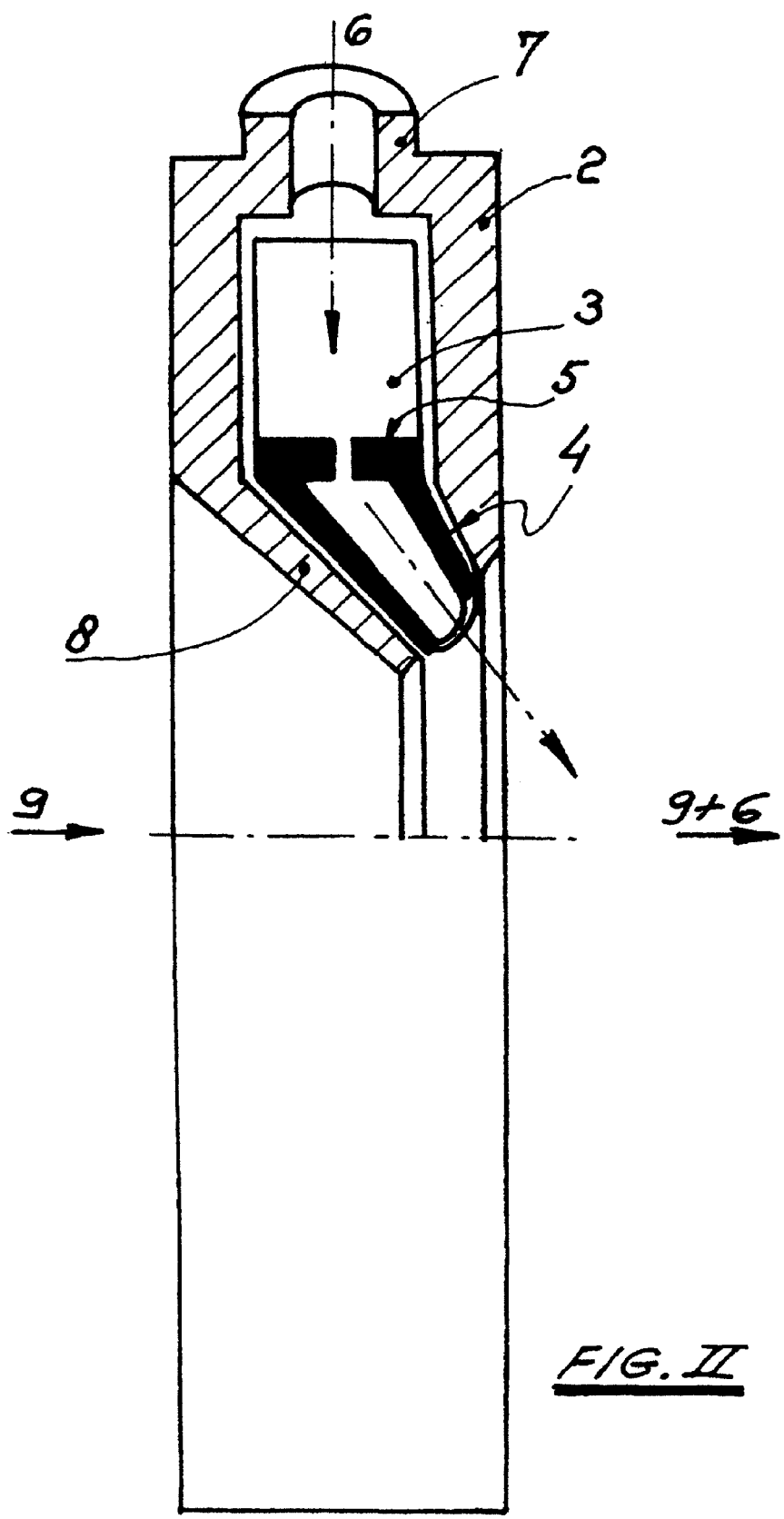
FIG. II

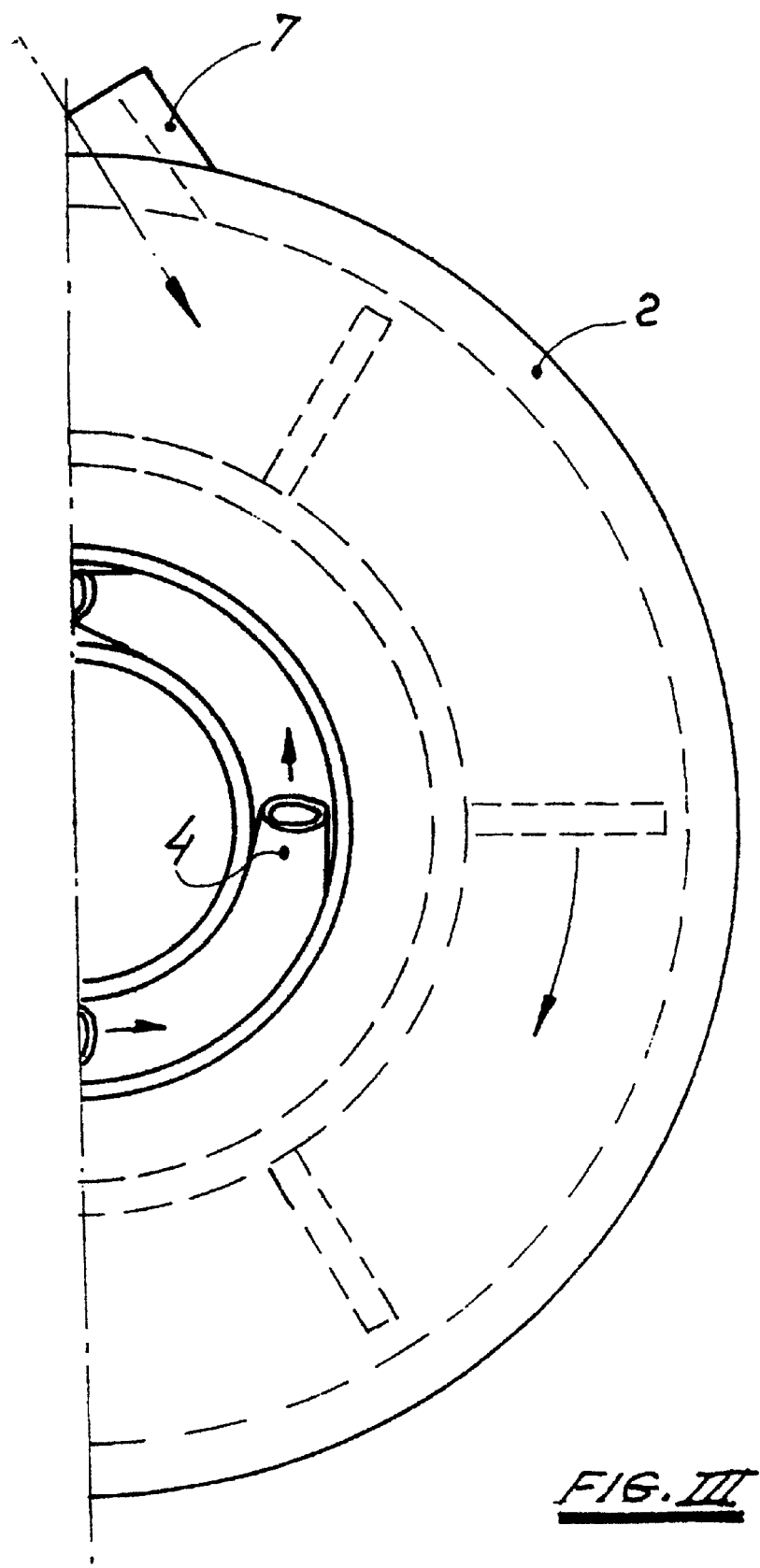
FIG. III

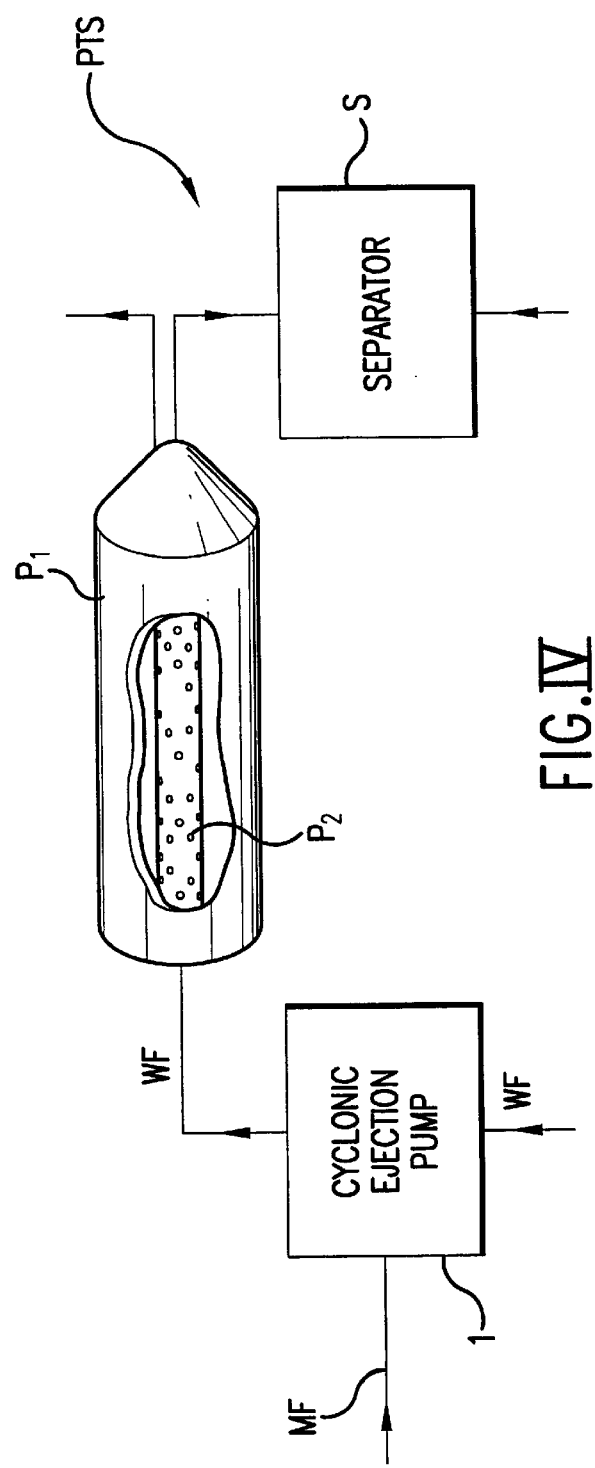
FIG.IV
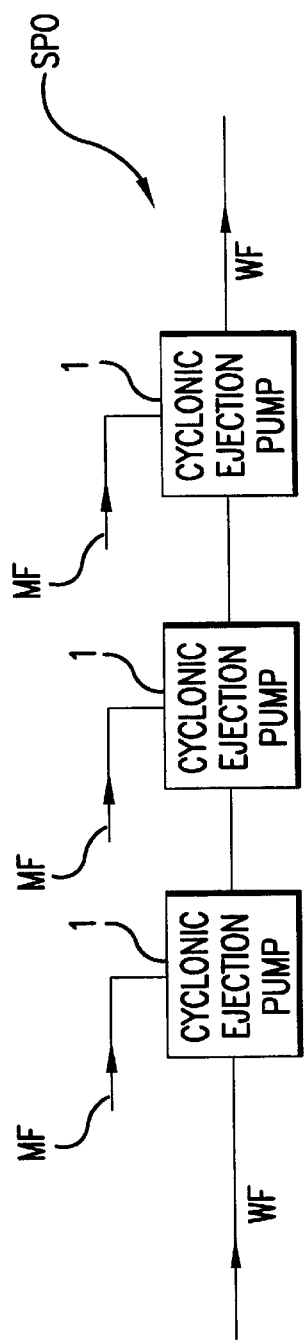
FIG.V

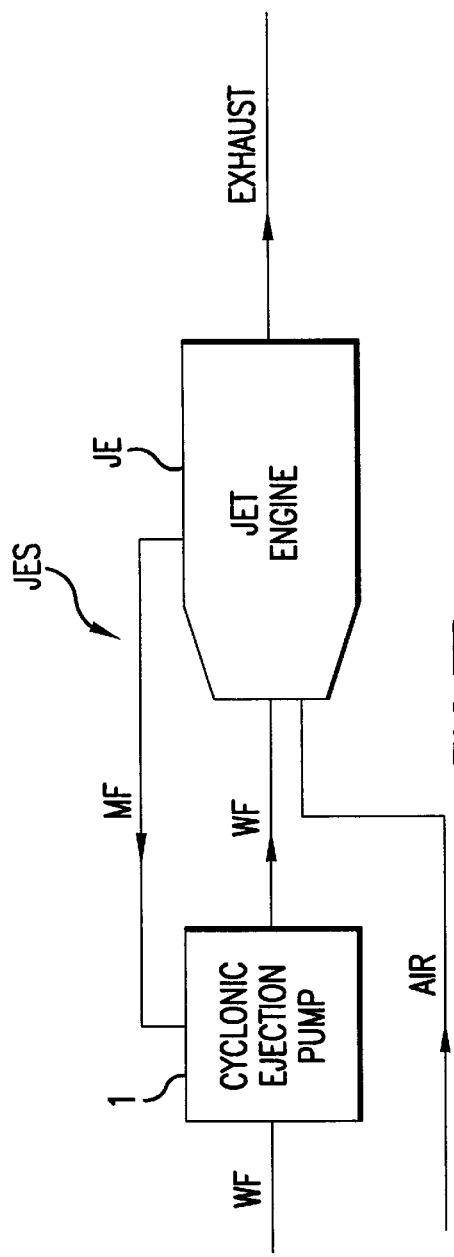
FIG. VI
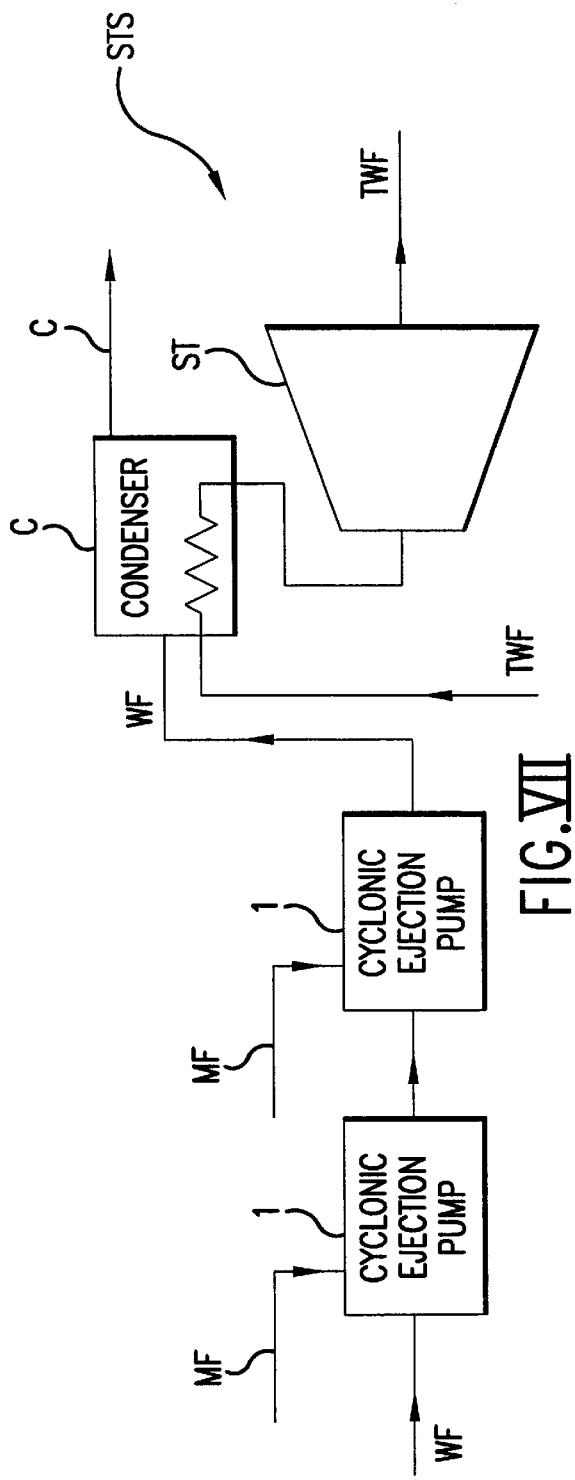
FIG. VII

CYCLONIC EJECTION PUMP

BACKGROUND OF THE INVENTION

The invention relates to a cyclonic ejection pump designed for large flow rates also applicable for propelling means, wherein the ejectors are fitted in between the blades of a turbine wheel.

SUMMARY OF THE INVENTION

Radial injection provides and maintains a rotation by special positioning of the exhaust diffusion pressure cone being mounted in such a way as to provide a certain angle between its longitudinal line with regard to the turbine radius perpendicular to the tangent line. In this manner, inside the inlet nozzle (diametrically relatively spaciously dimensioned), an artificial cyclone is generated, sucking and evacuating the pertaining medium. If applied for pumping powdery or granular material, a gaseous motive power is used, such as, for example, dry air. For liquids, such as sea water, normally steam will be applied for this purpose.

Gases can be pumped accordingly with advantage because of the possibility of evacuating and pressurizing at the same time, for which purpose normally steam or gas is used. However, a concentrated jet of water is also applicable. One thing or another depends mainly on the nature of the medium under consideration. As long as the radial injection on the turbine blades remains maintained, feed for the rotating ejectors is also available, preventing the pressurized medium from flowing back.

Considered as such, the cyclonic ejection pump according to the present invention can also be described as a check valve. Fully automatic control as required for propelling vessels can be obtained by a pressure-controlled feed-back system. The cyclonic ejection pump according to the invention is especially suited for power stations, more specifically those which derive their energy primarily from oceanic thermal energy conversion. By means of the invention, the evaporators can be evacuated to almost full vacuum. It should be clear that the pump as described lends itself to all those applications where a high capacity must be combined with heating, for example, occurring when, in a certain system, highly viscose liquids are used.

BRIEF DESCRIPTION OF THE DRAWINGS

One embodiment of the invention will be explained by way of example with reference to the accompanying drawings, wherein:

FIG. 2 represents a cross-section of the main cyclonic ejection pump;

FIG. 3 represents a side view of the pump.

FIG. 4 represents a pneumatic transport system incorporating the cyclonic ejection pump according to the present invention;

FIG. 5 represents a system for pumping oil including a plurality of cyclonic ejection pumps according to the present invention;

FIG. 6 represents a jet engine system incorporating the cyclonic ejection pump according to the present invention; and FIG. 7 represents a hydrogen-fired steam turbine system incorporating a plurality of cyclonic ejection pumps according to the present invention.

DETAILED DESCRIPTION

Figure 1:
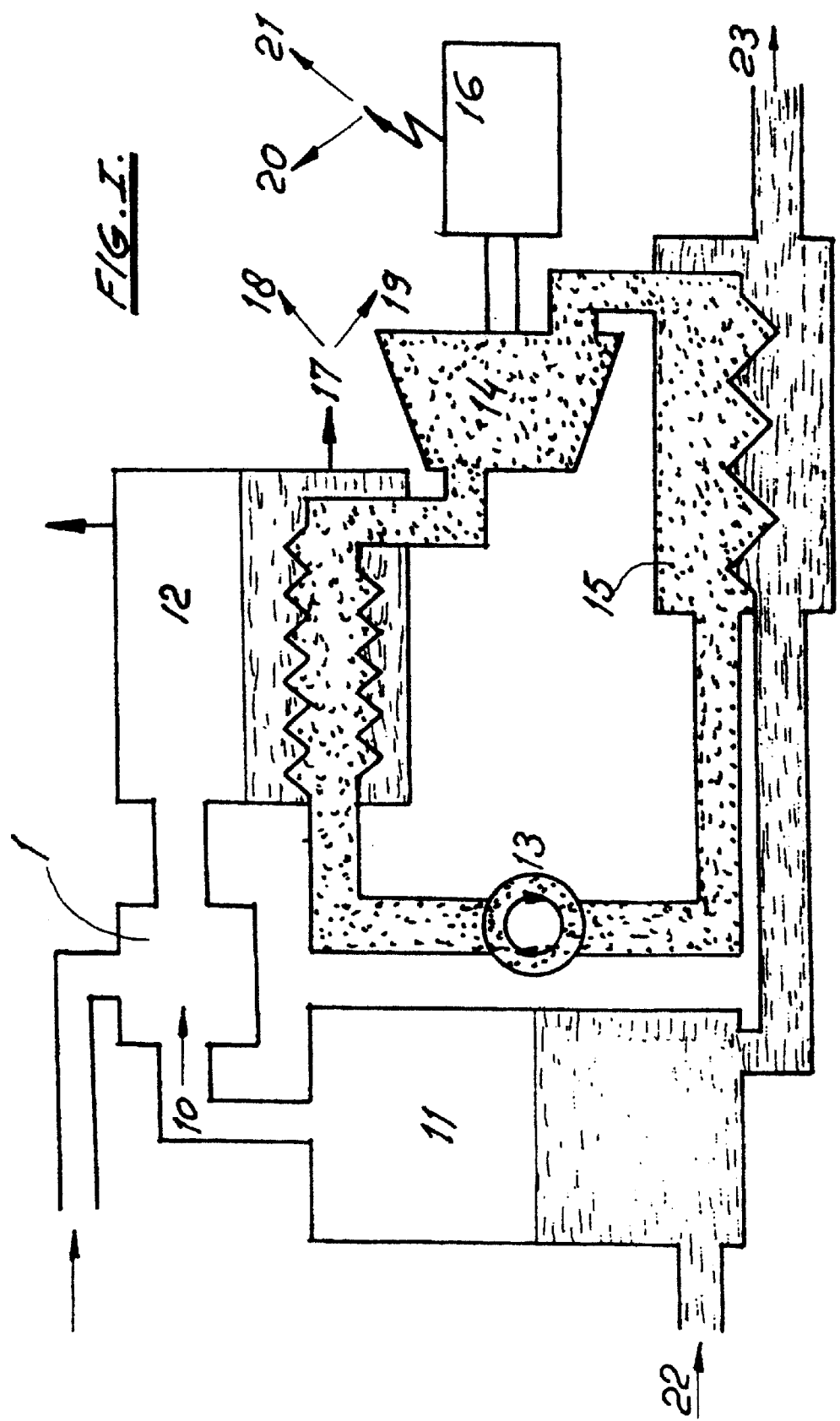
FIG. 1 represents a diagram of a power station combined with an installation for potable water supply.

Essentially, the cyclonic ejection pump 1 according to the invention comprises a stator 2 and a rotor 3, which is joined to jets 4. The jets 4 are molded or welded to the rim 5 of the rotor 3.

The motive power 6, being a medium specially adapted to the purpose,—for example steam,—is radially supplied by a nozzle 7. The stator 2 is internally provided with a molded converging compartment 8, protecting the ejectors 4 from wearing due to the material flow 9.

The oceanic thermal energy conversion system as shown in FIG. 1 represents an integral application example of the pump according to the invention. The vapor 10 of a salt water evaporator 11 is pumped to a condenser 12. The supply pump 13 maintains circulation in the circuit of a turbine 14, in which circuit, apart from condenser 12, a condenser 15 is included.

A generator 16 is driven by turbine 14. Condenser 12—essentially being a heat-exchanger—provides condensate 17, which is partly utilized as boiler make-up water 18 and partly as potable water 19. The generator 16 provides for an electricity supply to a distribution station 20 and to a boiler installation 21 that produces the required steam for pump 1.

According to one embodiment of the present invention, a pneumatic transport system PTS comprises a spearator S and a cyclonic ejection pump 1 as previously described. The PTS further includes a first pipe P1 and a second, perforated pipe P2 mounted concentrically inside the first pipe P1, the first pipe being adapted for leading a flow of pumped fluid from the cyclonic ejection pump 1 therethrough for effecting dust transport to separator S.

According to another embodiment of the present invention, a system for pumping oil SPO comprises a plurality of cyclonic ejection pumps 1 as previously described for pumping oil in stages to avoid hammering.

According to another embodiment of the present invention, a jet engine system JES comprises a jet engine JE. As noted previously, the cyclonic ejection pump according to the present invention is configured such that it can undergo an increase in working pressure without harm thereto as a consequence of the resulting temperature rise.

According to a further embodiment of the present invention, a hydrogen-fired steam turbine system STS includes a steam turbine ST and a plurality of cyclonic ejection pumps 1 as previously described. As set forth above with respect to the power station of FIG. 1, the pumped working fluid can be used in a condenser C to impart heat to the working fluid TWF for the steam turbine, and still provide condensate C to be used as boiler make-up water.

In the embodiment of FIGS. 4–7, MF stands for the motive fluid used in the cyclonic ejection pump 1, and WF for the working fluid.

What is claimed is:

1. A cyclonic ejection pump comprising:

a stator defining an inlet nozzle and an outlet;

a rotor having a plurality of blades;

a radial injector disposed for injecting a flow of working fluid toward the blades for causing a rotation of the rotor; and at least one exhaust diffusion pressure cone adapted to direct the flow of working fluid from a region of the blades toward the inlet nozzle, the at least one cone defining a longitudinal center line and being positioned in such a way as to define a predetermined angle between its longitudinal center line and a radius of the rotor intersecting the longitudinal center line so as to generate a cyclonic flow within the inlet nozzle for maintaining both a rotation of the rotor and a flow of pumped fluid from the inlet nozzle toward the outlet even where the flow of working fluid toward the blades is directed perpendicularly to a longitudinal axis of the rotor.

2. The cyclonic ejection pump according to claim 1, wherein:

the pump is made from a ceramic material; and the cone is disposed such that the flow of working fluid injected toward the blades generates a film of working fluid on the blades thereby increasing a wear resistance of the blades and further exerts a centripetal force on the rotor, the film of working fluid having a thickness that depends on the working fluid.

3. A pneumatic transport system comprising a separator, the cyclonic ejection pump according to claim 1, and further including a first pipe and a second, perforated pipe mounted concentrically inside the first pipe, the first pipe being adapted for leading a flow of pumped fluid from the cyclonic ejection pump therethrough for effecting dust transport to the separator.

4. A system for pumping oil, the system comprising a plurality of cyclonic ejections pumps according to claim 1 for pumping oil in stages to avoid hammering.

5. A system comprising the cyclonic ejection pump according to claim 1, the system further comprising a turbine and a condenser, the cyclonic ejection pump being disposed between the turbine and the condenser for reducing enthalpic wastage by the system.

6. A jet engine system comprising a jet engine and the cyclonic ejection pump according to claim 1, the cyclonic ejection pump being coupled to the jet engine and further being adapted to undergo an increase in a working pressure thereof for increasing an ignition pressure of the system such that a temperature rise resulting from the increase does not harm the cyclonic ejection pump.

7. A hydrogen-fired steam turbine system the system comprising a hydrogen-fired steam turbine and a plurality of cyclonic ejections pumps according to claim 1, the pumps being connected serially and being coupled to the steam turbine.

8. A system comprising the cyclonic ejection pump according to claim 1, wherein the pump is used within the system as a vacuum pump.

9. The system according to claim 8, the system being a cycle system for energy generation, the system further comprising components for producing potable water from saline water.

* * * * *